United States Patent [19]

Schmidt

[11] Patent Number: 4,696,843

[45] Date of Patent: Sep. 29, 1987

[54] DIFFERENTIAL PRESSURE SENSITIVE ADHESIVE JOINED BUSINESS FORM

[75] Inventor: Eric R. Schmidt, Palatine, Ill.

[73] Assignee: Uarco Incorporated, Barrington, Ill.

[21] Appl. No.: 932,358

[22] Filed: Nov. 19, 1986

[51] Int. Cl.⁴ .................................................. B32B 3/06

[52] U.S. Cl. .......................................... 428/41; 428/43; 428/57; 428/58; 428/77; 428/138; 428/189; 282/12 A; 282/11.5 A; 281/5

[58] Field of Search ........................ 428/40, 41, 43, 57, 428/58, 61, 77, 189, 138; 281/5; 282/12 R, 12 A, 11.5 A, 11.5 R

[56] References Cited

U.S. PATENT DOCUMENTS 3,111,449 11/1963 Gold et al. ............................ 428/40

4,627,994 12/1986 Welsch .................................. 428/41

*Primary Examiner*—Alexander S. Thomas

*Attorney, Agent, or Firm*—Wood, Dalton, Phillips, Mason & Rowe

[57] ABSTRACT

A business form includes a first sheet 16 of label stock having one side 24 coated with a first pressure sensitive adhesive 22, a first sheet 18 of release liner stock engaged with the first adhesive 22 with the release liner 18 and the label stock 16 being laterally offset from one another so that a narrow strip "N" of the first adhesive that is unengaged with the release liner 18 exists. A second sheet 36 of label stock is provided and is coated on one side 38 with a second pressure sensitive adhesive 40. A second sheet 42 of release liner stock is adhered at one edge to the first label stock sheet 16 at the narrow strip "N" of first adhesive 24 as well as to the second sheet 36 of label stock by the second adhesive 40. The characteristics of the two label stock or the characteristics of the two adhesives, or both may be varied to achieve various purposes.

13 Claims, 3 Drawing Figures

DIFFERENTIAL PRESSURE SENSITIVE ADHESIVE JOINED BUSINESS FORM

FIELD OF THE INVENTION

This invention relates to business forms, and more particularly, to a continuous business form having two or more removable, pressure sensitive labels and a corresponding number of release liners.

BACKGROUND OF THE INVENTION

As is well known in the business form art, there is a large variety of uses for label bearing business forms, particularly of the continuous type. Not infrequently, it may be desirable that such a business form include two related label type panels, one of which might contain variable information and the other of which might contain fixed information.

Such a form might find use, for example, in the packaging, shipping and sale of various consumer items having an aesthetic appearance. In particular, one of the labels might be applied to a container for the device and contain variable information such as shipping information or identification of model number, etc. The other label might contain instructions for installation or set-up and be affixed directly to the product itself.

In such a situation, it is generally desirable that the first label be applied permanently to the shipping container or the like so that it will not become detached during shipping or warehousing. At the same time, the second label should be removably applied to the product so that it can be removed by the end user to avoid its detracting from the aesthetic appearance of the product.

In other instances, it may be desirable that there be two such labels but formed of different label stock. For example, one label might receive variable or even fixed information relating to shipping or model number which is to be affixed to a package or removably affixed to a product and another label might be desirably permanently affixed to the product to include operating instructions. The first label, in such a case, might be an ordinary paper type lable, while the second label desirably should not mar the appearance of the device and possibly might have a decorative appearance.

Desirably business forms of this type should be of the continuous variety to lend themselves to rapid processing.

One concern in manufacturing business forms of this sort is meeting the desirable criteria that the business form have a generally uniform thickness and at least generally uniform rigidity characteristics across the width to facility rapid manufacture as well as subsequent processing by the purchaser of such forms.

The present invention is directed to providing a business form having the aforementioned desirable characteristics and meeting the foregoing processing and manufacturing concerns.

SUMMARY OF THE INVENTION

It is the principal object of the invention to provide a new and improved business form. More specifically, it is an object of the invention to provide a new and improved business form of the label bearing type including two labels which may be of different stock and/or provided with differing adhesives having different characteristics.

An exemplary embodiment of the invention achieves the foregoing object and a business form including a first sheet of label stock of a desired width and having one side coated with a first pressure sensitive adhesive. A first sheet of release line stock of about the desired width has a release side engaged with the first adhesive. The first release liner and the first label stock sheets are laterally offset from one another so that a narrow strip of the first adhesive nonengaged with the first release liner exists. The form includes a second sheet of label stock of a width greater than a narrow strip and having one side coated with a second pressure sensitive adhesive. A second sheet of release liner stock is adhered at one edge to the first label stock sheet at the narrow strip of first adhesive by the first adhesive and covers and is adhered to the second label stock sheet by the second adhesive.

Such a construction is ideally suited for utilizing either different label stocks, or different pressure sensitive adhesives, or both. For example, one label stock sheet may be of decorative material and the other of ordinary paper or the like. Similarly, one pressure sensitive adhesive may be permanent while the other may be removable.

And of course, both label stock and adhesive may be varied in a single form.

In a highly preferred embodiment, each of the sheets constitutes an elongated ply and one of the release liner plies oppositely the strip, is provided with control punch holes so that the business form is a continuous business form.

Where the business form is a continuous business form, individual form lengths are delineated by cross lines, lines of weakening extending across the plies.

Preferably, the first release liner and the first label stock plies are of equal width as are the second release liner and the second label stock plies. A strip is removed from one edge of one of the release liners thereby exposing a strip of adhesive. A strip of substantially equal width is removed from the adjacent edge of the other label stock ply to thereby expose a strip of release liner. The exposed strip of adhesive and exposed strip of release liner are then united to form the business form.

Other objects and advantages will become apparent from the following specification taken in connection with the accompanying drawings.

DESCRIPTION OF THE PREFERRED EMBODIMENT

Figure 1:
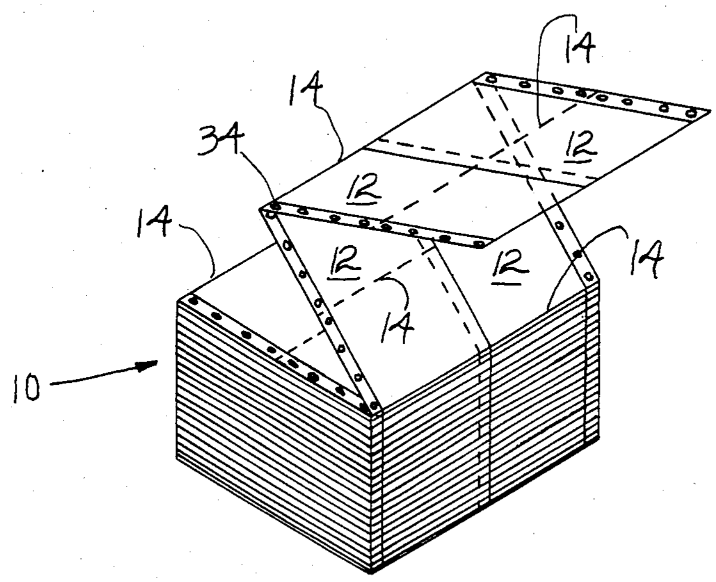
FIG. 1 is a perspective view of a continuous business form made according to the invention in a zigzag folded stack.

An exemplary embodiment of a business form made according to the invention and in continuous form is illustrated in the drawings. With reference to FIG. 1 it is seen to be folded in a zigzag folded stack, generally designated 10. Of course, the business form could be in cut sheet form if desired.

In any event, when in continuous form, the form is composed of a plurality of individual form lengths 12 folded on alternate cross lines of weakening 14 which generally are in the form of perforations extending through the plies defining the form across the length thereof.

According to the invention, four elongated plies are employed in manufacturing the business form.

The first is an elongated first ply 16 of label stock. A second is a elongated first ply of release liner stock 18. The release liner stock 18 includes a waxy finish 20 of conventional construction which is in releasable engagement with a first adhesive 22 coated on one side 2 of the ply 16.

Figure 2:
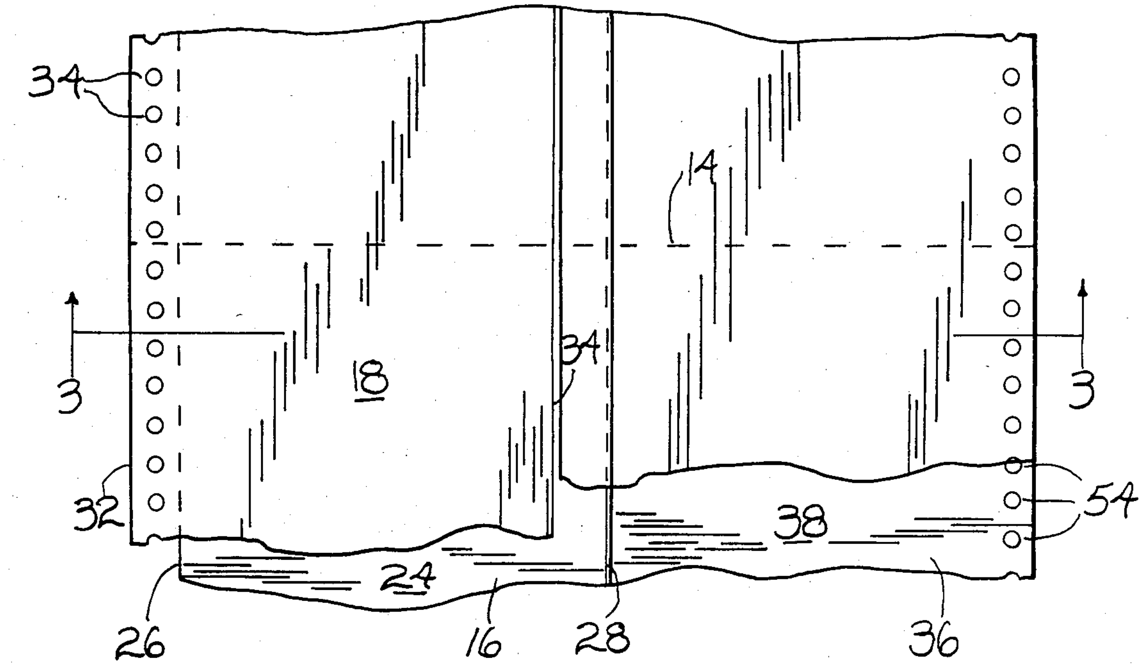
FIG. 2 is an enlarged, fragmentary plan view of the business form with parts broken away for clarity.

Longitudinal edges of the ply 16 are designated 26 and 28, respectively. Longitudinal edges of the ply 18 are respectively illustrated at 32 and 34. From FIGS. 2 and 3 it can be seen that the ply 16 and 18 are of equal width and that the ply 16 is laterally offset from the ply 18 such that, without more, there would be an elongated, exposed, narrow strip of the adhesive 22 in the area designated "N" in FIG. 3.

The marginal edge or side 32 of the ply 18 is displaced from the edge 26 of the ply 16 and includes a series of control punch holes 34 that are utilized both in the manufacture and in the processing of the business form for feeding purposes as is well known.

A third ply is a second label stock ply 36 having one side 38 coated with a second pressure sensitive adhesive 40.

A fourth ply is a elongated, release liner ply 42 having a width approximately equal to the sum of the widths of the strip "N" and the ply 36. It has a conventional waxy release coating 44 on the side thereof facing the ply 36 and is adhered thereto via the adhesive 40. One edge 46 of the ply 42 overlies the narrow strip "N" and thus is adhered to the ply 16 via the first adhesive 22 on the strip "N".

Edges 50 and 52 of the plies 36 and 42, both remote from the strip "N", include a line of control punch holes 54 again for feeding purposes.

As generally alluded previously, the first and second adhesives 22 and 40 may have like or different characteristics depending upon the use to which the form is put. Similarly, the label stock plies 16 and 36 may have the same or different characteristics for the same reason.

In one embodiment, the adhesive 32 may be a permanent adhesive while the adhesive 40 may be a removable one (or vice versa). That is to say, that once the label formed of the ply 16 is adhered to an object via the permanent adhesive 22, such label cannot be removed from that object without destruction because of the permanence of the adhesive connection provided by the adhesive 22.

Such an adhesive may be utilized in affixing a shipping label or the like to a container. It may also be utilized in permanently affixing an identifying label or a set of operating instructions to an object or, for example, an appliance.

In an embodiment such as just mentioned, where the adhesive 40 is releasable, it is intended that the ply 36 and label defined thereby be easily removable from the object to which it is supplied without substantial destruction of the label or ply 36, and even more preferably, without leaving any residue of the adhesive 40 on the object from which it is removed. In such a case, the label defined by the ply 36 may be utilized in providing an installation or set-up instruction. For example, such a label may be applied to a glass panel on an oven or the like advising that packing material for oven grates within the oven must be removed before the oven may be operated or stating leveling instructions. An enormous variety of other uses for such a removable label will be readily apparent to those skilled in the art.

In some instances, the stock of which the plies 16 and 36 are formed may be quite different. For example, if the ply 36 and the label formed thereby is to be utilized for model identification or shipping purposes, it would typically be formed of a more or less ordinary paper stock. In such a case, the other part of the form, namely, the label defined by the ply 16 may be intended to be permanently attached to some sort of device without marring the aesthetic appearance thereof. For example, operating instructions or control indicators might be affixed to appliances by printing the instructions or indicators on the ply 16 which then is permanently affixed to the appliance. In such a case, to avoid poor aesthetics, the ply 16 could be formed of any of a variety of appropriate decorative materials. Metalized label material is a strong possibility. Others will readily occur those skilled in the art.

In any event, as a consequence of the novel construction provided by the inventive business form, it is ideally suited and sufficiently flexible for use in those instances where two differing label stock or two labels with different adhesive characteristics or both are required. The business form has the advantage of being readily producible in continuous form. And because the form is substantially only two plies thick across its entire width, it is of sufficiently uniform thickness and uniform rigidity as to be easily handled during both manufacture and subsequent processing.

Figure 3:
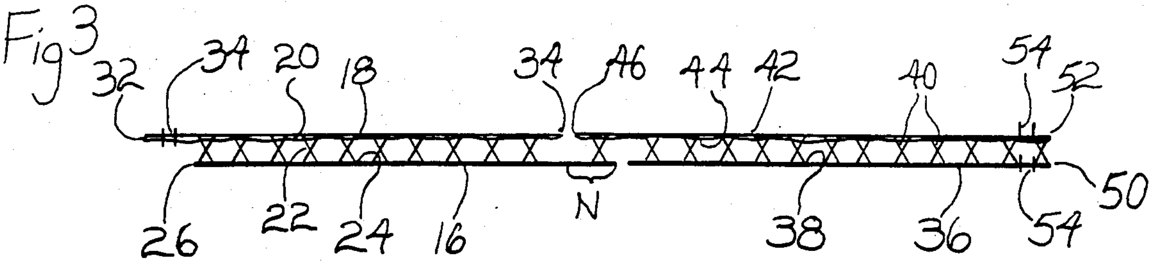
FIG. 3 is a somewhat schematic sectional view of the business form taken approximately along the line 3—3 in FIG. 2.

The form may be easily made by utilizing preformed label and release liner assemblies of conventional construction where, for example, both of the plies 16 and 18 are of equal width and both of the plies 36 and 42 are of equal width. Through the conventional slitting techniques, the left hand edge of the ply 32 as viewed in FIG. 3 is removed to expose the edge 46 of the ply 42 so as to provide an exposed strip of release liner. A similar slitting and removal operation is performed on the right hand edge of the release liner ply 18 so a to form an exposed strip of adhesive between the edges 28 and 34. The width of the exposed strip of release liner and exposed strip of adhesive is designated "N" in FIG. 3. The edges 34 and 36 are brought into substantial abutment and the exposed strip laminated together in the area "N" to form the business form. Generally speaking, the bringing of the edges 34 and 46 to within 1/32 of an inch of each other will provide good results.

Thus, a novel business form having the desirable characteristics stated previously is additionally easily manufactured.

I claim:

1. A continuous business form comprising:

an elongated ply of first label stock of a desired width and having one side coated with a first pressure sensitive adhesive having a given adhesive characteristic;

an elongated ply of first release liner stock of about said desired width and having a release side releasably engaged with said first adhesive on said one side;

said first release liner and said first label stock plies being laterally offset from one another so that a narrow longitudinal strip of said first adhesive unengaged with said first release liner exists;

an elongated ply of second release liner stock of greater width than said narrow strip and releasably adhered at one edge to said first label stock at said narrow longitudinal strip of first adhesive; and an elongated ply of second label stock having one side coated with a second pressure sensitive adhesive having a given adhesive characteristic;

said second label stock and said second release liner being releasably adhered to each other by said second adhesive.

2. The continuous business form of claim 1 wherein the longitudinal edge of said first release liner remote from said narrow longitudinal strip of first adhesive is uncovered on both sides and includes aligned holes defining a control punch margin for forms feeding purposes.

3. The continuous business form of claim 1 wherein individual form lengths of said continuous business form are delineated by cross lines of weakening extending across said plies.

4. The continuous business form of claim 1 wherein one of said release liner plies and the other of said label stock plies have strips removed from their adjacent edges to respectively define a strip of exposed release liner and a strip of exposed adhesive;

and said one and said other plies are laminated together by bringing said strips into contact with each other.

5. The continuous busines form of claim 1 wherein said first and second label stocks are different materials.

6. The continuous business form of claim 1 wherein one of said given adhesive characteristics is permanence and the other of said given adhesive characteristic is releasability.

7. A business form comprising:

a first sheet of label stock of a desired width and having one side coated with a first pressure sensitive adhesive;

a first sheet of release liner stock of about said desired width and having a release side engaged with said first adhesive on said one side;

said first release liner and said first label stock sheets being laterally offset from one another so that a narrow strip of said first adhesive unengaged with said first release liner exists;

a second sheet of label stock of a width greater than said narrow strip and having one side coated with a second pressure sensitive adhesive; and a second sheet of release liner stock adhered at one edge to said first label stock sheet at said narrow strip of first adhesive by said first adhesive and covering and adheredto said second label stock sheet one side by said second adhesive.

8. The business form of claim 7 wherein each of said sheets is an elongated ply, one of said release liner plies oppositely of said strip having control punch holes so that said business form is a continuous business form.

9. The business form of claim 8 wherein one of said adhesives is permanent and the other is releasable.

10. The business form of claim 7 wherein said first and second adhesives are different adhesives.

11. The business form of claim 7 wherein said first and second adhesives are the same.

12. The business form of claim 11 wherein said first and second label stocks are different.

13. A business form comprising:

a first sheet of label stock of a desired width and having one side coated with a permanent pressure sensitive adhesive;

a first sheet of release liner stock of about said desired width and having a release side engaged with said permanent adhesive on said one side;

said first release liner and said first label stock sheets being laterally offset from one another so that a narrow strip of said permanent adhesive unengaged with said first release liner exists;

a second sheet of label stock of a width greater than said narrow strip and having one side coated with a releasable pressure sensitive adhesive; and a second sheet of release liner stock adhered at one edge to said first label stock sheet at said narrow strip of permanent adhesive by said permanent adhesive and covering and adhered to said second label stock sheet one side by said releasable adhesive.

* * * * *